United States Patent [19]

Mobbs et al.

[11] Patent Number: 5,218,132

[45] Date of Patent: Jun. 8, 1993

[54] REMOVAL OF BENZOPYRENE FROM EDIBLE OILS USING AN ACTIVATED CARBONIZED ADSORBENT

[75] Inventors: David B. Mobbs, Handforth; David Shaw, Warrington, both of United Kingdom; Simon Pollard, Alberta, Canada

[73] Assignee: Laporte Industries Limited, London, England

[21] Appl. No.: 738,667

[22] Filed: Jul. 31, 1991

[30] Foreign Application Priority Data

Aug. 8, 1990 [GB] United Kingdom ............... 9017344

[51] Int. Cl.$^5$ ................................... C11B 3/10
[52] U.S. Cl. ................................ 554/191; 554/175
[58] Field of Search ................ 260/427; 554/191, 175

[56] References Cited

U.S. PATENT DOCUMENTS

| | | | |
|---|---|---|---|
| 2,245,016 | 6/1941 | Simpson | 252/242 |
| 2,457,556 | 12/1948 | Heinemann | 196/147 |
| 4,612,178 | 9/1986 | Lalancette | 423/338 |

FOREIGN PATENT DOCUMENTS 1278379 3/1984 United Kingdom.
1394755 7/1984 United Kingdom.

OTHER PUBLICATIONS

Stajszczyk et al., Chemical Abstracts, vol. 114, #24, 231712x.
Chemical Abstracts vol. 95, 1981 No. 117715q.

Primary Examiner—José G. Dees
Assistant Examiner—D. D. Carr
Attorney, Agent, or Firm—Kane, Dalsimer, Sullivan, Kurucz, Levy, Eisele and Richard

[57] ABSTRACT

Adsorbents suitable for use to remove aromatic or polyaromatic hydrocarbons from liquids such as oils may be produced from an acid-activated siliceous clay containing adsorbed oil by treating to carbonize the oil and to activate the carbon so produced on the surface of the clay. The carbonization and activation steps may be conducted by heating in the presence of an activating agent which may be zinc chloride. Preferably zinc chloride activated material is subsequently steam-treated.

The invention is particularly useful to reduce the content of hazardous polyaromatic hydrocarbons, such as benzo(a)pyrene, from edible oils.

11 Claims, 2 Drawing Sheets

I = ACID-ACTIVATED MONTMORILLONITE

II = ZnCl$_2$ ACTIVATED CARBONISED OIL-ADSORBED I

I = ACID-ACTIVATED MONTMORILLONITE
II = ZnCl$_2$ ACTIVATED CARBONISED OIL-ADSORBED I

I = PHENOL

II = 3-CHLOROPHENOL

III = 2,3-DICHLOROPHENOL.

REMOVAL OF BENZOPYRENE FROM EDIBLE OILS USING AN ACTIVATED CARBONIZED ADSORBENT

BACKGROUND OF THE INVENTION

1. Field of the Invention

This invention relates to the production of useful adsorbents from spent oil bleaching adsorbents.

2. Brief Description of Related Art

The bleaching of vegetable or mineral oils by treating them with particulate adsorbent material is practised on a large scale and gives rise to considerable residue disposal problems. Spent adsorbent usually contains from about 20% to about 40% by weight of residual oil, and may give rise to the hazard of spontaneous ignition in contact with air, particularly if the adsorbed oil is an unsaturated one. Dumping of this material may therefore be practised only under quite rigorous precautions. There exist a variety of methods for extraction of some or all of the adsorbed oil, such as treating with hot water containing a surface active agent, which may reduce the content of adsorbed oil to as little as about 5% by weight but produces a water phase which requires work-up to separate the oil in re-usable form. Organic solvent extraction processes are also available but are subject to the need to take stringent precautions for environmental and operator protection from solvent emissions.

A variety of adsorbents may be used to bleach oils for example activated charcoal, silica gel, alumina, and bleaching earths such as fuller's earth, kaolinite, attapulgite or montmorillonites. Apart from activated charcoal these materials do not have any particularly high activity in relation to the removal of many aromatic impurities from oils although they may be effective to various degrees in reducing the content of colour bodies in the oil. The impurities referred to may be simple aromatic molecules such as phenols or they may be polyaromatic hydrocarbons which may be present in fish oil and in certain vegetable oils such as coconut oil and rapeseed oil. Certain polyaromatic hydrocarbons, such as benz-(a)pyrene, are known or suspected carcinogens and it is desirable to remove these compounds and other aromatic materials from oils intended for consumption and from organic or aqueous wastes or effluents.

It has previously been proposed in Polish Patent Specification No. 107835 to produce adsorbents from spent bleaching earths or zeolites which are coated with organic compounds having a high content of carbon, such as an oil, by treating them with a mineral acid carbonising agent at a temperature of from 0° C. to 250° C. A wide variety of uses is postulated for the adsorbents so obtained although no demonstration of effectiveness for any use is described in the specification. The products obtained from a repetition of the teaching of this patent were found to be of poor physical form and to have no adsorptive effect in relation to aromatic hydrocarbons.

SUMMARY OF THE INVENTION

The present invention provides a process for producing an adsorbent for use to adsorb aromatic or polyaromatic compounds from liquids by subecting a mineral adsorbent containing adsorbed oil to a procedure whereby the oil is carbonised the process being characterised in that the mineral adsorbent containing the adsorbed oil is a smectite mineral, for example a montmorillonite, which has previously been acid activated and in that the carbonisation has been conducted at a temperature greater than 250° C.

DETAILED DESCRIPTION OF THE PREFERRED EMBODIMENTS OF THE INVENTION

Acid-activation has a fundamental effect on the structure of the smectite minerals as well as causing the partial or complete replacement of calcium or magnesium or sodium cations by hydrogen cations. The smectite minerals have a layered structure composed of an octahedral alumina sheet bonded via —Si—O— bonds to adjacent tetrahedral silica sheets to form a clay platelet, the crystallographic repeat distance or basal spacing of which is of the order of 10 Angstroms in the dry clay mineral and somewhat increased in the water-wet clay mineral. When a layered mineral of this type is treated with a strong mineral acid such as sulphuric acid, nitric acid or hydrochloric acid, the alumina layer is attacked at the platelet edges to dissolve out alumina and to generate pores having a diameter in excess of 15 Angstroms and usually from 20 to 50 Angstroms in the platelets. This has the effect of altering the adsorption characteristics of the clay mineral. An increasing degree of acid treatment is accompanied by an increasing surface area as measured by the well-known BET nitrogen adsorption method. For example a calcium/magnesium montmorillonite having a initial surface area of 94 $m^2g$ when treated with 35% sulphuric acid at 85°-90° C. may show an increasing surface area with increasing time of treatment as follows:

| | |
| --- | --- |
| 1 hour | 124 $m^2/g$ |
| 2 hours | 227 $m^2/g$ |
| 3 hours | 266 $m^2/g$ |
| 4 hours | 295 $m^2/g$ |

A similar effect may be observed using acid of increasing concentration for a set duration of, for example, 1 hour. The silica content of the acid treated clay increases due to the removal of alumino from the clay in the course of acid treatment. The silica content of the acid activated clay utilised in the practice of the present invention is preferably at least about 55%, for example at least 60% by weight calculated as $SiO_2$ and/or has preferably been increased by at least 2%, particularly preferably by at least 5% and possibly by up to as much as about 10% by weight calculated on the same basis.

Figure 1:
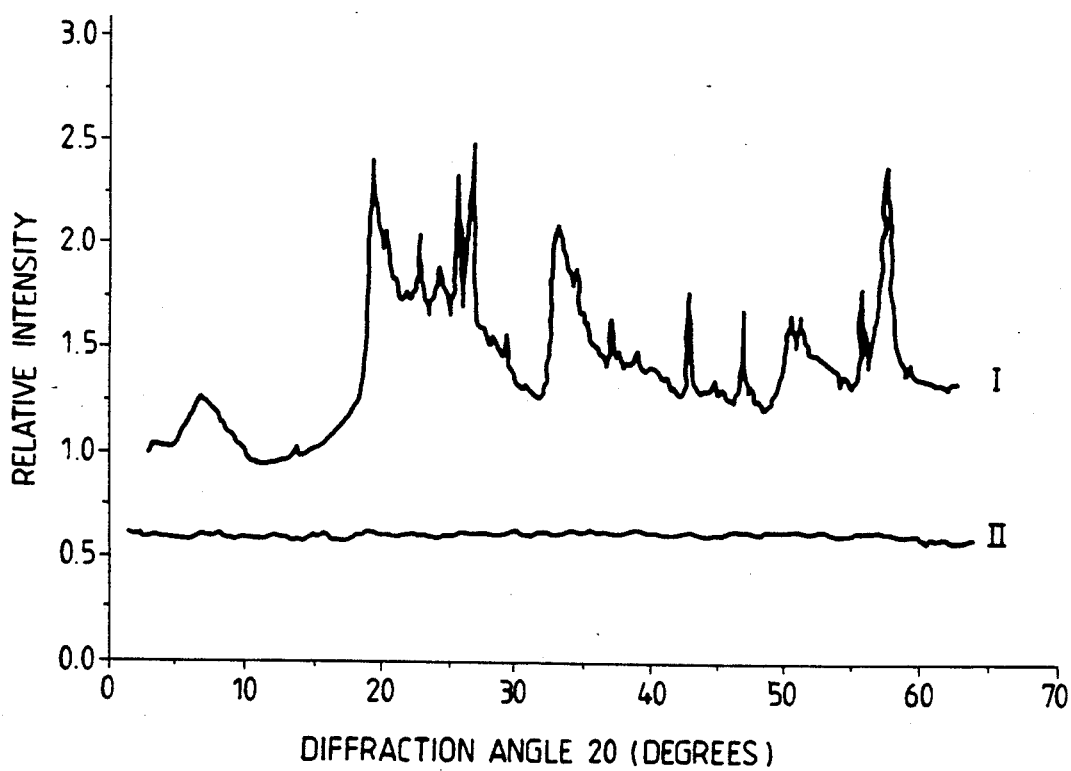
FIG. 1 depicts the results of x-ray diffraction of an acid-activated montmorillonite for use according to the invention and of the adsorbent produced therefrom by a carbonization/activation process using zinc chloride according to the invention.

The adsorbent produced according to the invention from acid-activated smectite mineral has been found by scanning electron microscopy to show evidence of the retention of an exfoliate physical structure although it is found by x-ray diffraction to be substantially amorphous orystallographically depending on the severity of the acid activation. It appears that the more complete penetration of oil between the clay platelets which is possible when the clay has been acid-activated and the generation of carbon from that oil at sites well within the clay platelets may act to stabilise the physical structure of the clay. The excellent adsorption activity of the products of this invention for aromatic or polyaromatic molecules may be due at least in part to this characteristic structure retention. FIG. 1 attached hereto depicts the results of x-ray diffraction investigation of an acid activated montmorillonite suitable for use according to the present invention (I) and of the adsorbent produced therefrom by a carbonisation/ activation process using zinc chloride according to the present invention (II).

Accordingly the present invention further provides a carbon-containing adsorbent comprising a siliceous material derived from a clay mineral by carbonisation of adsorbed oil therein, the adsorbent being characterised by containing an increased surface area as a result of acid-activation and being x-ray amorphous but retaining at least some exfoliate physical structure when examined by scanning electron microscopy.

Smectite minerals may be defined as a group of minerals or phyllosilicates of the 2:1 layer type showing an exfoliate external appearance under scanning electron microscopy and having the general formulae:

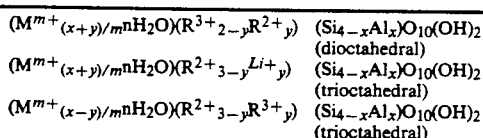

where $M^{m+}$ represents exchangeable cations such as $Ca++$, $Mg++$, having a valency m, necessary to satisfy the negatively charged lattice, $R^{2+}$ represents magnesium or iron and $R^{3+}$ represents aluminium or iron. The smectite group of minerals includes the mineral sub-groups montmorillonite, beidellite, nontronite, saponite, hectorite and sauconite. Minerals belonging to the montmorillonite (dioctahedral), saponite or hectorite (trioctahedral) groups are particularly preferred for use according to the present invention. Fullers earth, commonly used for oil bleaching, is a montmorillonite containing predominantly $Ca++$ and $Mg++$ exchangeable cations.

It has been found by the Applicants that while an acid-activated smectite has substantially no adsorption effect in relation to an aromatic molecule such as, for example, phenol or 4-nitrophenol, the product of this invention, produced from the same acid-activated smectite which has had vegetable oil adsorbed on it, has an excellent adsorption capacity for the same molecules. When the process is varied to use a mineral which has not previously been acid-activated a great reduction in the adsorption effect in relation to the same molecules is observed. Preferably the acid-treated smectite mineral has a surface area of at least 100 m$^2$/g, particularly preferably up to 450 m$^2$/g for example, ideally, at least 200 m$^2$/g and up to 400 m$^2$/g.

As indicated above the acid-treated mineral as processed according to the invention will usually have from about 20% to about 40% by weight of oil adsorbed on it, although the quantity may be less, for example down to 10%, or greater, for example up to 60%. The oil may be either a mineral oil, by which is meant is an oil derived from a naturally occurring deposit usually with intervening processing such as refining or may be a vegetable oil. If the product of this invention is to be used in relation to the purification of edible or potable materials it is preferred that the carbon therein has been derived by the carbonisation of vegetable oils. Examples of suitable vegetable oils are coconut oil, soya oil, sunflower oil and rapeseed oil. Very suitably the oil-adsorbed mineral is the spent by-product of an oil-purification process which is a particularly environmentally beneficial and cost-effective form of the invention.

The method of carbonisation and activation of the oil has a considerable effect on the character of the product. A variety of methods of carbonisation and activation are known but in the context of the present invention result in products having a reduced adsorption efficiency or no adsorption effect whatever in relation to aromatic molecules. Physical activation methods such as treatment with steam or carbon dioxide proved ineffective possibly because the oxidising conditions prevailing may have caused burn-off of surface carbon or because the high temperatures which are necessary may have caused the beginnings of platelet collapse and the resulting loss of internal porosity. It is noted that smectite minerals such as montmorillonite start to lose structural water at temperatures between about 715° C. and 750° C. Chemical methods of activation such as treatment with strong mineral acid, with metal chlorides, hydroxides, carbonate or nitrates, with polyphosphoric acid or with hydrogen peroxide achieved very variable results. The best results were obtained using activating agents known to have a dehydrating effect such as sulphuric acid and zinc chloride of which the latter was, surprisingly, considerably the more effective. It may be that these activating agents act to facilitate dehydration of the oil and facilitate partial aromatisation of the condensed triglyceride to yield a pseudographitic microporous char within the body of the adsorbent mineral. The most effective activating agent was found to be zinc chloride which gave products having the highest adsorption activity despite sometimes yielding only a modest quantity of carbon. It was also found that a subsequent steam-treatment could still further improve the performance of a zinc-chloride-activated product of the invention, although not products of the invention activated by other means, despite the strongly oxidising atmosphere existing during steam treatment which would be expected to result in a very severe loss of carbon. Where sulphuric acid or other strong mineral acid is used as the activating agent a temperature of above 300° C. is desirably used. This helps to avoid a diminution of the adsorbent power of the product in respect of benz(a)pyrene or other aromatic materials.

Subject to the above, the mode of use of a particular activating agent, within the context of this invention, may be according to previous practice in the art as typified by the following literature references and as described in the examples hereafter.

a) Metal chloride activating agents e.g. $ZnCl_2$, $CaCl_2$, $MgCl_2$
   Topics in Inorganic and General Chemistry, Elsevier, UK, (1970), Ch. 2, pp. 28-35.
b) Metal hydroxide activating agents e.g. $Ca(OH)_2$, $Mg(OH)_2$.
   Sulphuric acid
   Activated Carbon, Leonard Hill, London, (1967), Ch. 8, pp. 178-199.

c) Transition metal nitrates e.g. $Co(NO_3)_2$, $Fe(NO_3)_2$
Preparation of activated carbon for air pollution control Fuel, 67, (1988), pp. 1237–1241.
d) Polyphosphoric acid (P205)
Active Carbon, Marcel Dekker, New York, (1988), Ch. 1, pp. 7–22.
e) Hydrogen peroxide
Environ. Technol. Letters, 10, (1988), pp. 275–282.

When the activating agent is the preferred zinc chloride the present process is suitably conducted by treating the oil-loaded mineral with an aqueous solution of zinc chloride, drying to deposit the zinc chloride onto the mineral, heating under chemically inert conditins to carbonise the oil, heating further to achieve activation of the carbon, cooling, preferably washing with acid to remove ash and residual activant and preferably filtering and water washing to remove residual acid. The product may then be solvent-washed, if desired, and dried.

Preferably the ratio of zinc chloride to oil loaded-mineral adsorbent is from 1:3 to 1:1 by weight particularly preferably about 1:2. Preferably the carbonisation temperature is from 350° C. to 500° C. The carbonisation is preferably conducted under a nitrogen atmosphere and the duration of the carbonisation stage may suitably be 1 to 5 hours. The activation stage is preferably conducted at a temperature of 500° to 750° C. although a somewhat lower upper temperature limit of 715° C. may be advised if dehydroxylation of the mineral at above this temperature causes undue platelet collapse and loss of available pore volume as a result. The activation stage is preferably conducted in a $CO_2$ atmosphere and the final cooling in an inert, preferably a nitrogen, atmosphere.

The subsequent steam treatment of the zinc chloride-activated material is preferably conducted at a temperature of up to about 800° C. for example from 500° C. to 750° C. or, particularly suitably, from 550° C. to 700° C. Temperatures above 700° C. may increasingly cause loss of carbon and also loss of surface area as a result of delamination of the mineral although in some cases this effect may not be marked at temperatures in the range 700°–800° C. The steam treatment may be conducted for a relatively shorter time at higher temperatures within the above ranges the duration of the treatment being very suitably selected in the range of about 20 minutes to about 2 hours.

The adsorbent produced according to the present invention may be used to remove aromatic impurities from oils, including solutions of oils or of fats, or to remove aromatic pollutants from aqueous wastes or they may be used for any suitable adsorbent application.

The invention will now be illustrated by means of the following examples.

EXAMPLES 1-16

Spent oil-bleaching adsorbent was simulated by adsorbing 30% of virgin soyabean oil, by weight of the oil and mineral, onto an acid-activated calcium magnesium montmorillonite mineral adsorbent having a silica content of 60% wt and a total surface area (BET method) of 232 $m^2g^{-1}$ and a Hedley Acidity of 2.4%. This acid-activated mineral adsorbent is available from Laporte Industries Limited under the Tradename Fulmont Premiere. Samples of the oil-adsorbed mineral (30% w/w crude soyabean oil) were impregnated with a selected chemical activant as indicated in Table I below. In the case of the metallic chlorides and the transition metal nitrates 90 g of activant was dissolved in distilled water to produce a 25% w/w solution which was adsorbed onto 100 g of the oil-adsorbed mineral. The same quantity of metal hydroxides or of calcium carbonate was dry mixed with the oil-adsorbed mineral. The homogenised mixtures so produced were oven-dried at 105° C. for 16 hours and then introduced into a rotary furnace under flowing nitrogen where they ere purged for 1 hour at 20° C. and were then heated to 450° C. at a rate of 5° C./minute. Following a 2 hour dwell at this temperature to allow carbonisation to take place the temperature was raised at a similar rate to 600° C. which was maintained for 1 hour under $CO_2$ to allow activation to take place. The activated mixtures were then cooled, washed in 2 molar HCl to remove ash and residual activant, vacuum filtered and washed successively with hot and cold distilled water and with acetone followed by drying at 105° C. for 16 hours.

In the case of sulphuric acid and polyphosphoric acid activants 10 g of the acid was mixed with 30 g of the oil-adsorbed mineral and the mixture was carbonised in a static air muffle furnace in covered crucibles at 350° C. for 5 hours. In the case of the hydrogen peroxide activant a 1:2 by weight paste of 100 volume hydrogen peroxide and the oil-adsorbed mineral was formed and heated similarly at 350° C. for 4 hours followed by 0.5 hours at 450° C. In these cases washing and drying procedures were conducted as for metallic chloride activants. The carbon content of these activated adsorbents was determined.

The adsorption capacities of the composite mineral/carbon adsorbents produced as above described for an aromatic material were measured by adding 100 $cm^3$ of 10 mM aqueous phenol or 4-nitrophenol to 1.0 g of adsorbent in 250 $cm^3$ polythene screw-cap bottles. The bottles were subjected to 3 hours of end-over-end rotation at 40 rpm at a temperature of 20°+2° C. Residual phenol or 4-nitrophenol was monitored after filtration using direct UV spectrophotometric methods (Franson, M. A. H. et al Standard Methods for the Examination of Water and Wastewater. 16th Ed., APHA, AWWA, WPCF, (1985), p. 560).

To provide a correlation between 4-nitrophenol adsorption and benzo(a)pyrene adsorption comparative pairs of tests were performed using a different adsorbent, produced as indicated in the respective examples referred to below, for each pair of tests. The removal of 4-nitrophenol was tested as above described. The removal of benzo(a)pyrene was tested by treating crude coconut oil containing 10 ppb of benzo(a)pyrene using an open bleaching procedure at an adsorbent dosage of 2 g/100 g oil, a of 95° C. and a duration of 35 minutes. Residual benzo(a)pyrene in the treated oil was determined by HPLC analysis using a calibration curved obtained from standard solutions. The following pairs of results were obtained:

| 4-nitrohenol % removed | B(a)P % removed |
|---|---|
| 23.7 (Ex 48) | 8.4 |
| 31.6 (Ex 47) | 77.8 |
| 45.9 (Ex 46) | 86.9 |
| 53.1 (Ex 45) | 95–100 |

While the correlation is not exact the figures show that at phenol removals of above about 30% excellent benz-(a)pyrene removal efficiency may be achieved and that, at best, substantially 100% benz(a)pyrene removal efficiency is possible when utilising the present invention.

To provide a comparison adsorption capacities were also obtained for (A) the same acid-activated mineral which had not been subjected to the oil-adsorption/carbonisation/activation treatment (B) the oil-adsorbed filter cake without any carbonisation or activation steps, (C) a commercial activated carbon available under the trade name Norit SA4 and having a surface area of 629 m.sq./g and (D) a composite adsorbent which comprises a hydroxyapatite particle support coated with a suger refining bone char and which is available under the Trade Name Brimac CC and has a surface area of 95 m.sq./g.

The criticality of prior acid activation of the smectite mineral is demonstrated by comparitive tests in which a zinc chloride carbonised/activated product of this invention based on an acid activated montmorillonite gave a residual benz(a)pyrene content in soya oil of 4.0 parts per billion (1012) whereas a similar product based on the same montmorillonite which had not been acid activated and therefore not according to the invention gave a residual content of 11.5 parts per billion.

The adsorption capacities obtained together with the carbon contents of the adsorbents are indicated in Table I.

TABLE I

| Ex No. | Activant | Carbon Content (% w/w) | Phenol Adsorbed m.mol/g | Adsorption Capacity (mole %) |
|---|---|---|---|---|
| 1 | None | 10.3 | — | — |
| 2 | $ZnCl_2$ | 10.5 | 0.232 | 23.2 |
| 3 | $CaCl_2$ | 6.1 | 0.123 | 12.3 |
| 4 | $MgCl_2$ | 7.4 | 0.028 | 2.8 |
| 5 | $Ca(OH)_2$ | 6.5 | 0.107 | 10.7 |
| 6 | $Mg(OH)_2$ | 10.2 | 0.110 | 11.2 |
| 7 | $CaCO_3$ | 8.4 | 0.075 | 7.5 |
| 8 | $Co(NO_3)_2$ | 6.0 | 0.086 | 8.6 |
| 9 | $Fe(NO_3)_3$ | 4.9 | 0.067 | 6.7 |
| 10 | $H_2SO_4$ | 18.3 | 0.021 | 20.2 |
| 11 | $P_2O_5$ | 11.0 | 0.122 | 12.2 |
| 12 | $H_2O_2$ | 9.8 | 0.026 | 2.6 |
| 13 | Mineral (A) | 0.2 | — | — |
| 14 | Filter Cake (B) | 24.2 | — | — |
| 15 | Norit SA4 (C) | 85.4 | 0.912 | 91.0 |
| 16 | Brimac CC (D) | 9.8 | 0.198 | 19.5 |

Figure 2:
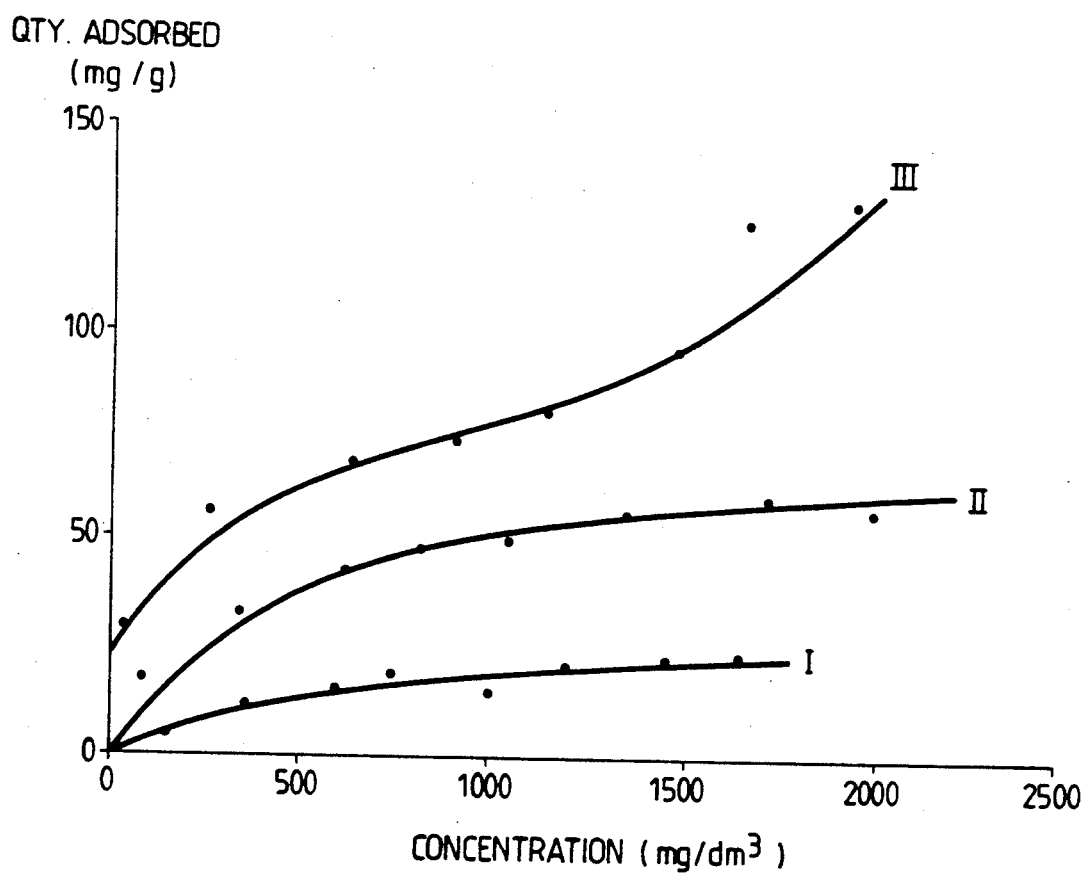
FIG. 2 summarises equilibrium adsorbate concentrations for an adsorbent produced in Example 1, infra.

To show that the adsorbent according to the invention is suitable for use in relation to a range of aromatic compounds single component, solution phase adsorption isotherms were constructed at 20°±2° C. for an adsorbent according to the invention and produced as in Example I using phenol, 3-chlorophenol and 2,3-dichlorophenol adsorbates. The batch adsorption experiments were run at pH 4.1–5.9 using non-buffered solutions. The contact time was 3 hours. The dry sorbent (105° C., 16 hours) was sieved to <150 um (100 mesh) prior to use. Aliquots (100 cm³) of 30–0.5 mM adsorbate (20–0.5 mM 2,3-dichlorophenol on account of its reduced aqueous solubility) were added to 1.0 g sorbent samples in 120 cm³ glass screw cap bottles which were then rotated at 40 rpm for 3 hours. Equilibrium adsorbate concentrations were then monitored at 500 nm by visible spectrophotometry (Perkin Elmer Lambda 3 UV/VIS spectrophotometer) using a standard colorimetric 4-aminoantipyrine method. The results are summarised in FIG. 2 attached hereto.

EXAMPLES 17–48

In the following examples the effect of certain processing parameters is investigated.

The same oil-impregnated mineral as was used in the preceding examples (70 parts by weight of mineral to 30 parts by weight of virgin soyabean oil). 1420 g $ZnCl_2$ was dissolved in 1300 cc distilled water and blended with the oil-impregnated mineral. The mixture was dried at 105° C. in an air-circulating oven for 4 days. The dried product was ball-milled to <150 microns. 60 g samles of the milled powder were carbonised and activated in a single operation in a rotary furnace. The products were washed successively with acid, water and acetone as previously described and oven-dried at 105° C. for 16 hours. Single processing parameters were varied as indicated in the following Table II around the following standard conditions.

| Carbonisation | Heating rate | (Cr) | 5° C./min. |
|---|---|---|---|
| | Time | (Ct) | 120 mins. |
| | Temperature | (CT) | 450° C. |
| Activation | Heating rate | (Ar) | 5° C./min. |
| | Temperature | (AT) | 600° C. |
| | Time | (At) | 60 mins. |
| | Atmosphere | (Aa) | $N_2$ |

Ratio Mineral + oil:$ZnCl_2$ (RZn) = 10:9

The total surface area (BET) of the products (S(tot)), their carbon content, and their % adsorption capacity for 4-nitrophenol (4-NP) and phenol (P) were determined and are also stated in Table II.

TABLE II

| Ex No. | Variable | | S(tot) | C % wt | Ads. 4-NP | Capacity % P |
|---|---|---|---|---|---|---|
| 17 | Cr | 2 | 295 | 20.3 | 49.2 | 36.2 |
| 18 | Cr | 5 | 295 | 21.1 | 48.3 | 34.4 |
| 19 | Cr | 10 | 280 | 21.0 | 44.2 | 29.0 |
| 20 | Cr | 20 | 206 | 18.9 | 42.9 | 31.6 |
| 21 | CT | 350 | 211 | 21.0 | 48.7 | 38.7 |
| 22 | CT | 400 | 306 | 21.4 | 48.7 | 34.9 |
| 23 | CT | 450 | 201 | 20.1 | 46.8 | 34.6 |
| 24 | CT | 500 | 247 | 19.3 | 44.2 | 31.1 |
| 25 | Ct | 60 | 271 | 19.7 | 48.6 | 30.1 |
| 26 | Ct | 120 | 277 | 20.2 | 49.8 | 32.2 |
| 27 | Ct | 240 | 281 | 19.7 | 48.8 | 33.1 |
| 28 | Ct | 360 | 269 | 21.6 | 53.9 | 34.5 |
| 29 | Ar | 5 | 266 | 20.6 | 50.2 | 37.2 |
| 30 | Ar | 10 | 239 | 20.0 | 48.7 | 30.0 |
| 31 | Ar | 20 | 244 | 19.6 | 42.3 | 23.0 |
| 32 | AT | 500 | 315 | 19.2 | 46.0 | 26.8 |
| 33 | AT | 600 | 251 | 19.4 | 45.6 | 33.0 |
| 34 | AT | 650 | 217 | 19.5 | 42.5 | 30.1 |
| 35 | AT | 700 | 176 | 18.7 | 38.7 | 26.3 |
| 36 | AT | 750 | 165 | 18.4 | 33.3 | 29.2 |
| 37 | At | 30 | 263 | 18.2 | 45.5 | 28.0 |
| 38 | At | 60 | 283 | 19.5 | 46.1 | 36.2 |
| 39 | At | 120 | 218 | 18.9 | 42.8 | 31.3 |
| 40 | At | 360 | 217 | 19.3 | 43.3 | 34.6 |
| 41 | Aa | $N_2$ | 260 | 19.3 | 42.9 | 39.9 |
| 42 | Aa | $CO_2$ | 269 | 19.9 | 43.6 | 36.8 |
| 43 | Aa | Air | 116 | 7.7 | 14.7 | 17.0 |
| 44 | RZn | 10:20 | 309 | 20.0 | 43.3 | 30.8 |
| 45 | RZn | 10:9 | 233 | 20.9 | 53.1 | 32.7 |
| 46 | RZn | 10:5 | 239 | 20.1 | 45.9 | 32.9 |
| 47 | RZn | 10:2 | 180 | 13.3 | 31.6 | 5.4 |
| 48 | RZn | 100:1 | 226 | 13.3 | 23.7 | 0 |

EXAMPLES 49–61

In the following Examples the effect of steam-treatment is investigated.

Samples of the zinc chloride activated simulated spent oil-bleaching adsorbent of Examples 1–16 were steam treated at the temperatures and for the times indicated in Table III. The carbon contents of the samples and their phenol adsorption capacities, expressed as m moles phenol/g adsorbent, are also indicated in Table III.

TABLE III

| Ex No. | | Phenol/mmolg$^{-1}$ | C/% w/w |
| --- | --- | --- | --- |
| 49 | ZnCl$_2$ Control | 0.3103 | 18.1 |
| 50 | 600° C./30 min. | 0.3577 | 16.3 |
| 51 | 650° C./30 min. | 0.3188 | 17.2 |
| 52 | 700° C./30 min. | 0.2653 | 17.3 |
| 53 | 750° C./30 min. | 0.1567 | 16.4 |
| 54 | 800° C./30 min. | 0.1010 | 15.7 |
| 55 | 850° C./30 min. | 0.1773 | 12.8 |
| 56 | 600° C./60 min. | 0.3006 | 17.8 |
| 57 | 650° C./60 min. | 0.3454 | 17.8 |
| 58 | 700° C./60 min. | 0.2542 | 16.6 |
| 59 | 750° C./60 min. | 0.2965 | 16.4 |
| 60 | 800° C./60 min. | 0.2794 | 15.7 |
| 61 | 850° C./60 min. | 0.1934 | 11.4 |

What is claimed is:

1. A process for the removal of benzo(a)pyrene from vegetable or fish oil, which comprises; contacting the oil with an adsorbent produced by a process which comprises subjecting a previously acid-activated smectite mineral containing the adsorbed oil, to carbonization of the adsorbed oil by heating the mineral at a temperature greater than 250° C.; activation of the carbon thereby formed by heating in the presence of an activating agent; allowing the benzo(a)pyrene to become adsorbed onto the adsorbent; and then removing the adsorbent containing the benzo(a)pyrene from contact with the oil.

2. A process as claimed in claim 1 wherein the oil adsorbed on the smectite is carbonised and activated by heating in the presence of a metal chloride activant.

3. A process as claimed in claim 1 wherein the oil adsorbed on the smectite is carbonised and is activated by heating in the presence of an acid activant.

4. A process as claimed in claim 1 wherein the acid-activated smectite has a surface area of from 100 m$_2$/g to 450 m$_2$/g.

5. A process as claimed in claim 1 wherein the acid-activated smectite has a silica content of at least 55% calculated as SiO$_2$.

6. A process as claimed in claim 1 wherein the silica content of the acid-activated smectite has been increased from that of the smectite before acid activation by from 2% to 10% by weight calculated as SiO$_2$.

7. A process as claimed in claim 1 wherein the acid-activated smectite contains from 10% to 60% by weight of oil adsorbed thereon.

8. A process as claimed in claim 1 wherein the oil adsorbed on the smectite is carbonised by heating in the presence of zinc chloride or sulphuric acid adsorbed on the smectite.

9. A process as claimed in claim 1 wherein the smectite is heated at a temperature of up to 500° C. to achieve carbonisation of the oil adsorbed thereon.

10. A process as claimed in claim 1 wherein the smectite is further heated at a temperature of above 500° C. and up to 715° C. to activate the carbon.

11. A process as claimed in claim 1 wherein the adsorbent containing activated carbon is treated with steam at a temperature of from 500° C. to 800° C.

* * * * *